United States Patent
Lee et al.

(10) Patent No.: US 8,012,518 B2
(45) Date of Patent: Sep. 6, 2011

(54) STEP-DOWN SUCKLING METHOD FOR MINIMIZING WEANING STRESS IN NEWBORN CALF

(75) Inventors: Hyun June Lee, Pyeongtaek (KR); Wang Shik Lee, Suwon (KR); Muhanmmad Ajmal Khan, Gujranwala (PK); Kwang Seok Ki, Cheonan (KR); Hyeon Seop Kim, Suwon (KR); Byeong Seog Ahn, Daejeon (KR); Soo Bong Park, Hwaseong (KR); Sung Jai Park, Cheonan (KR); Guk Hyun Suh, Cheonan (KR); Tai Young Hur, Cheonan (KR); Sang Bum Kim, Jinju (KR); Byong Ho Park, Yongin (KR)

(73) Assignee: Republic of Korea (Rural Development Administration), Suwon, Gyeonggi-Do (KR)

( * ) Notice: Subject to any disclaimer, the term of this patent is extended or adjusted under 35 U.S.C. 154(b) by 253 days.

(21) Appl. No.: 12/308,817

(22) PCT Filed: Dec. 12, 2006

(86) PCT No.: PCT/KR2006/005393
§ 371 (c)(1),
(2), (4) Date: Dec. 24, 2008

(87) PCT Pub. No.: WO2008/013344
PCT Pub. Date: Jan. 31, 2008

(65) Prior Publication Data
US 2009/0304851 A1    Dec. 10, 2009

(30) Foreign Application Priority Data
Jul. 28, 2006 (KR) .................. 10-2006-0071328

(51) Int. Cl.
*A23K 1/18* (2006.01)

(52) U.S. Cl. ............................ 426/2; 426/635; 426/807

(58) Field of Classification Search ............... 426/2, 635, 426/807
See application file for complete search history.

(56) References Cited

U.S. PATENT DOCUMENTS

| | | | |
|---|---|---|---|
| 4,083,960 A * | 4/1978 | Yamashita et al. | 424/94.61 |
| 4,600,585 A | 7/1986 | Vitcenda et al. | |
| 4,652,454 A | 3/1987 | Remesy et al. | |
| 4,820,527 A | 4/1989 | Christensen et al. | |
| 5,205,240 A * | 4/1993 | Colas et al. | 119/57.4 |
| 5,795,602 A * | 8/1998 | Craig et al. | 426/2 |
| 6,156,333 A | 12/2000 | Langrehr | |
| 6,541,047 B1 | 4/2003 | Claycamp et al. | |

OTHER PUBLICATIONS

J. Jasper et al. Journal of Dairy Sci., vol. 85, issue 11, pp. 3054-3058, 2002 (abstract).*
Thompson et al. "Artificial Rearing of Lambs on Milk Replacer diets", Oregon State University Extension Service # EC1427, Oct. 1993, 4 pages.*
A.F. Kertz et al. Journal of Dairy Sci. vol. 62, issue 11, pp. 1835-1843, 1979 (abstract).*
P. D. Penning et al. Animal Feed Sci. & Technology, vol. 5, issue 4, pp. 321-336, 1980 (abstract).*
Daniel Weary, Advances in dairy Technology, vol. 13, p. 107, 2001.*

* cited by examiner

*Primary Examiner* — C. Sayala
(74) *Attorney, Agent, or Firm* — William G. Lane

(57) ABSTRACT

A step-down sucking method is provided for minimizing the weaning stress of newborn calves. The method features feeding newborn calves with a sufficient amount of milk corresponding to 15-25% of body weight for 3-5 weeks following birth, and then with a stepwise decreased amount of milk corresponding finally to 8-15% of body weight for 3-7 days, with the differential amount replaced with water and then with gradually decreased amounts of milk from 8-15% to zero % of the body weight and with solid feedstuffs for a period from 5 weeks to 6-8 weeks after birth, thereby inducing the calves to maximally take solid feedstuff with minimal weaning stress.

1 Claim, 1 Drawing Sheet

[Figure 1]
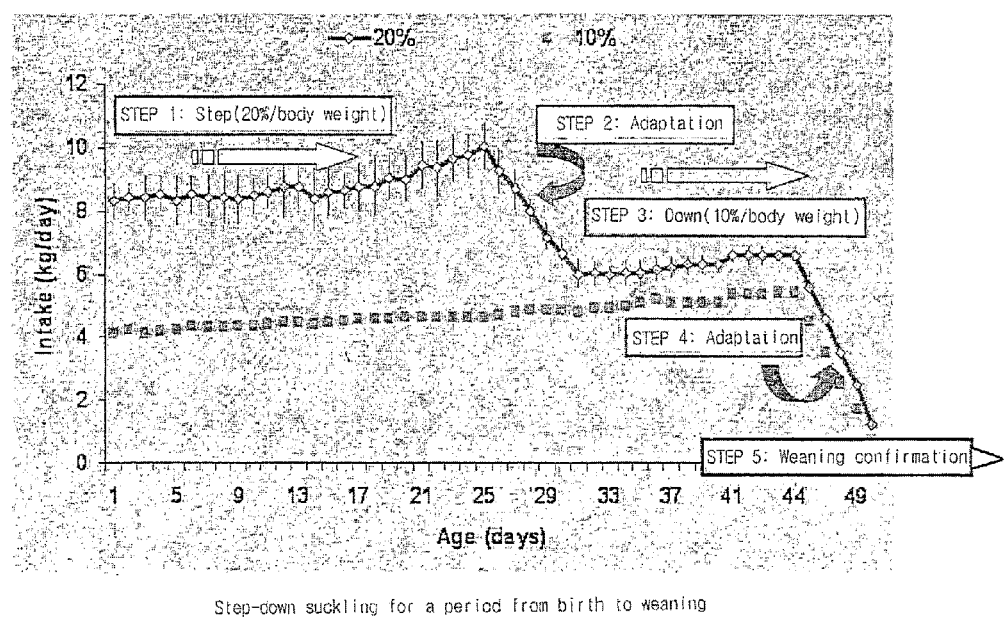
Step-down suckling for a period from birth to weaning

STEP-DOWN SUCKLING METHOD FOR MINIMIZING WEANING STRESS IN NEWBORN CALF

TECHNICAL FIELD

The present invention relates to a step-down suckling method by which newborn calves undergo minimal weaning stress and are raised to healthy cows. More particularly, the present invention relates to a step-down suckling method in which calves are fed with a sufficient amount of milk for 3~5 weeks following birth, and then with half of that amount so as to induce them to switch to solid feedstuff, without a decrease in nutrition. According to the method, the calves are sufficiently adapted to solid feedstuff before weaning and thus can increase their intake of solid feedstuff after weaning. Particularly, the suckling method of the present invention features an adaptation period, in which water is provided at gradually increasing amounts corresponding to the gradually decreasing amounts of milk just before a down suckling period and just before the weaning step.

BACKGROUND ART

Having only one source of nutrition, newborn mammals rely absolutely on milk from their mothers for their life (growth) before they are able to digest more diverse foods including solid feedstuffs. In addition, as the amount of milk from their mothers decreases, the young start to ingest solid feedstuffs to supplement insufficient nutrients therein. Weaning is the process of gradually introducing the young to what will be their adult diet and withdrawing the supply of milk. The young are considered to be fully weaned once they no longer receive any breast milk and begin to rely on solid foods for all their nutrition. In dairy farming, which primarily targets the production of milk, much effort has long been made to increase the daily production of milk from the mother cows higher than the amount that calves require and to maintain the production of milk at a high rate before subsequent parturition. For example, mother cows are prevented from suckling newborn calves on parturition day, in order to produce dairy products. Instead, the newborn calves are fed manually with expressed mother's milk, called artificial milk feeding.

Conventionally, dairy farmers feed calves with milk at a dose of 2 kg twice a day, amounting to 4 kg in total, using a milk bottle, or at a dose of 1.5 kg three or four times a day, amounting to 10% of the body weight in total.

With recent increasing interest in the welfare of young calves, attempts have been made to allow them to be fed with milk without restriction. When young calves have free access to artificial feeders or the udders of mother cows, they are observed to suckle 10 times a day at an amount of 10 kg in total. It is reported that 180 to 200 days after birth, however, the body weight of the calves which have been freely fed is not actually different from that of calves which have been restrictively fed a maximum amount of 10% of the body weight.

All such conventional suckling methods are disadvantageous in that because they are suddenly weaned from the milk, the young calves are not sufficiently adapted to the ingestion of solid feedstuff (fodder, hay, etc.) and thus are subject to malnutrition for a considerable period of time, which may lead to insufficient growth or immunodeficiency.

Particularly, calves which used to be satiated with milk undergo greater stress and thus require a longer time period to recover from stress. Dairy farmers are reluctant to allow young calves to freely approach udders or milk bottles for the following reasons. It takes a lot of labor to separate newborns from the mother cow every time suckling occurs. Also, the production of milk from the cows is reduced. Further, upon weaning, the young calves undergo psychological stress in addition to physical stress, so that they may become physically weak.

The problem of the conventional suckling methods resides in the fact that young calves are weaned without being sufficiently adapted to solid feedstuff, or such that they are undernourished. Therefore, there is a need for a precise suckling method that can minimize the weaning stress of calves, and for a system therefor.

DISCLOSURE

Technical Problem

It is therefore an object of the present invention to provide a step-down suckling method which allows calves to undergo minimal weaning stress and grow to healthy adults.

In the method, a sufficient amount of milk is fed to newborn calves for a period ranging from 3~5 days after birth, e. g. the end day of a beestings feeding period, to 3~5 weeks after birth, depending on the body weight thereof, so as to provide high nutrients for the calves. Next, the amount of milk is reduced stepwise to 8~15°% of the body weight at a rate of 1.5~2.5% per day over 3~7 days, with the differential amount replaced with water, so that the calves are adapted to reduced amounts of milk with minimal weaning stress. Afterwards, the calves are fed with gradually decreased amounts of milk from 8~15% to zero % of body weight and with solid feedstuff over 10~25 days to the weaning day (e.g., 6~8 weeks after birth), so that they feel hungry and are induced to frequently access the solid feedstuff. Therefore, the calves are in a state of having received good nutrition and show resistance to disease and stress just before weaning. Subsequently, the calves undergo minimal weaning stress and can quickly recover from the stress thereof, showing a high intake of solid feedstuff and persistent growth. In addition, entailing the ability to monitor the milk intake and the behavior of calves every day, the step-down suckling method of the present invention can afford a fully automatic, artificial intelligent managing system with which calves can be raised under optimal health care.

Technical Solution

In order to accomplish the above object, the present invention provides a method of suckling a newborn calf, comprising: feeding the newborn calf with milk in a daily amount of 15~25% of its body weight for 3~4 weeks following birth; then, feeding the newborn calf with diluted milk in a daily amount of 15~25% of its body weight for 3 to 7 days with solid feedstuff provided simultaneously, the diluted milk being stepwise diluted with water at an increasing rate until the amount of pure milk fed finally amounts to 8~15% of the body weight; then, feeding the newborn calf with milk at a daily amount of 8~15% of the body weight and with solid feedstuff from 5 weeks to 6~8 weeks following birth; and then, feeding the newborn calf with diluted milk in a daily amount of 8~15% over 3~7 days before weaning and with solid feedstuff, said diluted milk being stepwise diluted with water at an increasing rate until it is substituted with 100% water at the end of the feeding period.

Advantageous Effects

A step-down suckling method is provided for minimizing the weaning stress of calves, in which suckling with a large amount of milk (amounting to 15~25% of weight body) is conducted for 25~35 days after birth, followed by suckling with a decreased amount of milk (amounting to 8~15% of body weight) for 10~20 days, thereby inducing the calves to take solid feedstuff to a maximum extent with minimal weaning stress. The method of the present invention exhibits data quite different from the report in which there is no difference in the body weight of calves bred for 180 or 200 days after birth between a conventional suckling method, in which milk is fed in an amount of 10% of body weight, and a free-access method.

When fed according to the step-down suckling method of the present invention, calves were observed to increase their intake of dry feedstuff by 31% or greater until 50 days after birth and by 16% or greater until 120 days after birth, compared to when fed according to the conventional method. In addition, the weight gain of the calves fed according to the method of the present invention was found to increase by 75% until 50 days after birth and by 54% until 120 days after birth, compared to that of calves fed according to a conventional method.

DESCRIPTION OF DRAWINGS

FIG. 1 is a graph illustrating a step-down suckling method according to the present invention.

BEST MODE

Below, a detailed description will be given of the present invention, with reference to the drawing.

FIG. 1 is a graph illustrating a step-down suckling method in accordance with the present invention, which is conducted according to a five-step process.

To begin with, newborn calf individuals were fed with a small amount (around 1 kg) of beestings frequently (at intervals of 4~6 hours) for 3~5 days. Due to this beestings feeding condition, the calves can be bestowed with immunity from the mother. Thereafter, the calves are fed according to the program set forth in the step-down method in consideration of individual body weights.

In a first step, as shown in FIG. 1, calves are measured for body weight every 3 to 7 days and fed with milk four to six times a day at an aliquot feed in a total daily amount amounting to 15~25% of the respective body weights when using a milk bottle mounted on a machine for 25 days following birth. The dose is restricted within the amount from 1,500 to 2,000 cc. Simultaneously, a sufficient amount of calf starter is provided so that young calves take thereto.

A second step is to adapt the calves to a reduced amount of milk. Milk is diluted with water at an amount of 1.5~2.5% of the total daily feed amounting to 15~25% of the body weight, the calves are fed with the diluted milk for 3~5 weeks following birth, and with milk in an amount of 8~15% of the respective body weights from 4~5 weeks after birth. At this time, an increased amount of calf starter is provided, along with quality hay, so as to encourage the calves to improve in their ability to ingest solid feedstuff.

A third step is a down-suckling step in which calves are fed with milk in an amount of 8~15% of their respective body weights and are provided with highly nutritious calf starter and quality hay in an amount of 1 kg per head from 4~5 weeks after birth to the weaning day (set by the dairy farmer, generally 6~8 weeks after birth).

In a fourth step, the calves are secondarily adapted to milk reduction. From 3~7 days before the weaning day, the calves are fed with milk which amounts to 8~15% of the body weight and is diluted with water at an increasing rate of 1.5~2.5% of the fed milk everyday, and finally fed only with 100% water from 6-8 weeks after birth.

A fifth step is to confirm the weaning by verifying that the calves consume only water for 3~7 days from 6~8 weeks after birth.

According to the step-down suckling method of the present invention, the calves are improved in the intake of dry feedstuff and in weight gain and weight gain rate for 120 days after birth, as seen in the following graphs.

MODE FOR INVENTION

Industrial Applicability

As described hitherto, a step-down suckling method is provided for minimizing the weaning stress of calves, in which suckling with a large amount of milk (amounting to 15~25% of weight body) is conducted for 25~35 days after birth, followed by suckling with a decreased amount of milk (amounting to 8~15% of body weight) for 10~20 days, thereby inducing the calves to take solid feedstuff to a maximum extent with minimal weaning stress. The method of the present invention exhibits data quite different from the report in which there is no difference in the body weight of calves bred for 180 or 200 days after birth between a conventional suckling method, in which milk is fed in an amount of 10% of body weight, and a free-access method.

When fed according to the step-down suckling method of the present invention, calves were observed to increase their intake of dry feedstuff by 31% or greater until 50 days after birth and by 16% or greater until 120 days after birth, compared to when fed according to the conventional method. In addition, the weight gain of the calves fed according to the method of the present invention was found to increase by 75% until 50 days after birth and by 54% until 120 days after birth, compared to that of calves fed according to a conventional method.

The invention claimed is:
1. A method of suckling a newborn calf, comprising:
feeding the newborn calf with milk at a daily amount of 15~25% of its body weight for 3~4 weeks following birth;
then, feeding the newborn calf with diluted milk in a daily amount of 15~25% of its body weight for 3 to 7 days, with solid feedstuff provided simultaneously, the diluted milk being stepwise diluted with water at an increasing rate until the amount of pure milk fed thereto finally amounts to 8~15% of body weight;
then, feeding the newborn calf with milk in a daily amount of 8~15% of body weight and with solid feedstuff from 5 weeks to 6~8 weeks after birth; and
then, feeding the newborn calf with diluted milk in a daily amount of 8~15% for 3~7 days before weaning and with solid feedstuff, said diluted milk being diluted stepwise with water at an increasing rate until it is substituted with 100% water at the end of the feeding period.

* * * * *